(12) United States Patent
Hattori et al.

(10) Patent No.: US 9,984,303 B2
(45) Date of Patent: May 29, 2018

(54) OBJECT DETECTION SYSTEM, OBJECT DETECTION METHOD, POI INFORMATION CREATION SYSTEM, WARNING SYSTEM, AND GUIDANCE SYSTEM

(71) Applicant: HITACHI, LTD., Tokyo (JP)

(72) Inventors: Hideharu Hattori, Tokyo (JP); Tatsuhiko Kagehiro, Tokyo (JP); Yoshifumi Izumi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 128 days.

(21) Appl. No.: 15/158,742

(22) Filed: May 19, 2016

(65) Prior Publication Data
US 2016/0342855 A1  Nov. 24, 2016

(30) Foreign Application Priority Data

May 20, 2015  (JP) .................................. 2015-103237

(51) Int. Cl.
*G06K 9/34* (2006.01)
*G06K 9/00* (2006.01)
(Continued)

(52) U.S. Cl.
CPC ............. *G06K 9/342* (2013.01); *B60Q 9/008* (2013.01); *G06K 9/00805* (2013.01);
(Continued)

(58) Field of Classification Search
CPC .... B60Q 9/008; G06K 9/00805; G06K 9/342; G06K 9/52; G06K 9/00818; G08G 1/096783; H04N 1/6008
See application file for complete search history.

(56) References Cited

U.S. PATENT DOCUMENTS

| 9,672,606 B2* | 6/2017 | Hattori ............... G06K 9/00818 |
| 2002/0080998 A1* | 6/2002 | Matsukawa ........ G06K 9/00818 |
| | | 382/103 |

(Continued)

FOREIGN PATENT DOCUMENTS

| DE | 202012107886 A1 | 2/2014 |
| EP | 3 016 025 A2 | 5/2016 |
| JP | 2010-044445 A | 2/2010 |

OTHER PUBLICATIONS

Extended European Search Report received in corresponding European Application No. 16170341.8 dated Oct. 24, 2016.
(Continued)

*Primary Examiner* — Sean Conner
*Assistant Examiner* — Pinalben Patel
(74) *Attorney, Agent, or Firm* — Mattingly & Malur, PC

(57) ABSTRACT

Provided is a technique for, even when the lightness of an image contained in a video changes, accurately separating the background of the image and an object in the background and thus efficiently collecting images that contain a target object to be detected, and also suppressing the amount of data communicated between a terminal device and a server. In the present invention, a terminal device accurately separates the background of an image and an object (i.e., a target object to be detected) in the background so as to simply detect the object in the background, and transfers to a server only candidate images that contain the detected object. Meanwhile, as such simple target object detection may partially involve erroneous detection, the server closely examines the candidate images to identify the target object to be detected, and thus recognizes the object.

5 Claims, 10 Drawing Sheets

(51) Int. Cl.
*G08G 1/0967* (2006.01)
*B60Q 9/00* (2006.01)
*H04N 1/60* (2006.01)
*G06K 9/52* (2006.01)

(52) U.S. Cl.
CPC .......... *G06K 9/00818* (2013.01); *G06K 9/52* (2013.01); *G08G 1/096783* (2013.01); *H04N 1/6008* (2013.01)

(56) References Cited

U.S. PATENT DOCUMENTS

| | | | |
|---|---|---|---|
| 2002/0102017 A1* | 8/2002 | Kim | G06K 9/342 |
| | | | 382/164 |
| 2006/0034484 A1* | 2/2006 | Bahlmann | G06K 9/00818 |
| | | | 382/103 |
| 2010/0260426 A1* | 10/2010 | Huang | G06F 17/30247 |
| | | | 382/218 |
| 2015/0221069 A1* | 8/2015 | Shaburova | G06T 5/005 |
| | | | 382/167 |
| 2016/0286089 A1* | 9/2016 | Mori | H04N 1/6008 |

OTHER PUBLICATIONS

Cheng, H. D. et al., "Contrast Enhancement Based on a Novel Homogeneity Measurement", Pattern Recognition, Elsevier, Nov. 2003, pp. 2687-2697, vol. 36 No. 11.

Ling, W. H. et al., "Traffic Sign Recognition Model on Mobile Device", 2011 IEEE Symposium on Computers & Informatics, Mar. 2011, pp. 267-272.

* cited by examiner

FIG. 5
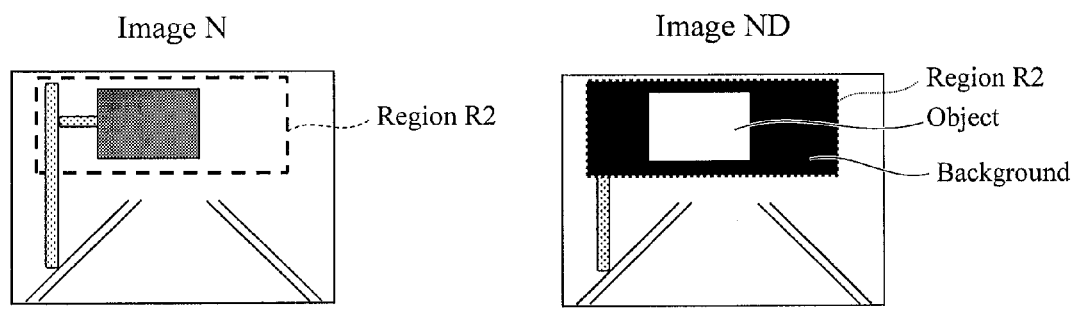
 ⇒ 
FIG. 6A      FIG. 6B
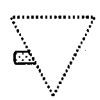 ⇒ 
FIG. 6C      FIG. 6D
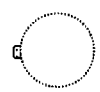 ⇒ 
FIG. 6E      FIG. 6F

OBJECT DETECTION SYSTEM, OBJECT DETECTION METHOD, POI INFORMATION CREATION SYSTEM, WARNING SYSTEM, AND GUIDANCE SYSTEM

CLAIM OF PRIORITY

The present application claims priority from Japanese patent application JP 2015-103237 filed on May 20, 2015, the content of which is hereby incorporated by reference into this application.

BACKGROUND

Technical Field

The present invention relates to an objection detection system, an object detection method, a POI information creation system, a warning system, and a guidance system.

Background Art

In recent years, there has been an increased need to detect accessories on the road from an image using a video captured with an imaging device, such as a smartphone or a drive recorder, and generate rich content that can be provided as additional information of map information and the like. In order to detect such accessories on the road, the technique proposed in Patent Document 1 is known, for example. In Patent Document 1, edge detection in an image and color conversion of the image are performed, and a speed sign is detected from a video captured with an in-vehicle imaging device with reference to the average value of the color in the image and the shape of the speed sign and the like.

RELATED ART DOCUMENTS

Patent Documents

Patent Document 1: JP 2010-044445 A

SUMMARY

However, with respect to images captured with an in-vehicle imaging device, the lightness of an image contained in a video will gradually change when the vehicle travelling direction changes in accordance with the travelling route on the road and the surrounding light thus changes among the forward light, back light, and direct sunlight, for example. Therefore, even when the "technique of detecting a target object from each image based on the average value of the color in the image" of Patent Document 1 is used, there is a problem in that it is impossible to separate the background of the image and an object in the background and thus detect the object in the background. Further, there is another problem in that as a video captured with an in-vehicle imaging device contains many textures, edges of a variety of objects are joined together, and thus, it is impossible to identify the position of a desired object in the video using edge information and thus detect the object in the background.

Further, when a video (i.e., all of captured images) captured with an imaging device, such as a smartphone, is transmitted to a server and the like over a mobile network, there is a problem in that the amount of data communicated may exceed the upper limit value (e.g., 7 GB/month), and the communication speed of the smartphone and the like in that month is thus suppressed (to 128 kbps, for example), which in turn decreases the convenience of the smart phone, and increases a burden on the user, and thus, video data cannot be obtained from the user.

The present invention has been made in view of the foregoing problems, and provides a technique for, even when the lightness of an image contained in a video changes, accurately separating the background of the image and an object in the background and thus efficiently collecting images that contain a target object to be detected, and also suppressing the amount of data communicated between a terminal device and a server.

In order to solve the aforementioned problems, in the present invention, a terminal device accurately separates the background of an image and an object (i.e., a target object to be detected) in the background so as to detect the object in the background, and transfers to a server only candidate images that contain the detected object. The server, in turn, closely examines the candidate images to identify the target object to be detected, and thus recognizes the object.

That is, an object detection system in accordance with the present invention includes a terminal device and a server, the terminal device including an imaging device configured to capture images, a first image processing device configured to receive the images from the imaging device and detect from the images an image that contains a target to be detected, and a first communication device configured to transmit data to and receive data from the server, and the server including a second communication device configured to transmit data to and receive data from the terminal device, a second image processing device configured to recognize the target to be detected from the image received from the terminal device, and a storage device configured to store data on the recognized target to be detected. The terminal device is configured to execute a process of, with the first image processing device, detecting from the captured images a candidate image that contains the target to be detected on the basis of a first evaluation criterion, and a process of, with the first communication device, transmitting to the server the candidate image detected on the basis of the first evaluation criterion. The server is configured to execute a process of, with the second communication device, receiving the candidate image, a process of, with the second image processing device, recognizing from the candidate image the target to be detected contained in the candidate image on the basis of a second evaluation criterion that is different from the first evaluation criterion, and a process of storing an image of the target to be detected and the candidate image into the storage device.

Further features related to the present invention will become apparent from the description of the specification and the accompanying drawings. In addition, embodiments of the present invention can be implemented by elements, a combination of a variety of elements, the following detailed description, and the appended claims.

It should be appreciated that the description in this specification illustrates only typical examples, and thus, the claims or examples of the application of the present invention should not be limited in any sense.

According to the present invention, it is possible to, even when the lightness of an image contained in a video changes, accurately separate the background of the image and an object in the background and thus efficiently collect images that contain a target object to be detected, and also suppress the amount of data communicated between a terminal device and a server.

BRIEF DESCRIPTION OF THE DRAWINGS

FIG. 5 is a diagram illustrating an example of the operation of an object detection unit 13.

FIGS. 6A to 6F are diagrams illustrating an example of the operation of an object determination unit 14.

DETAILED DESCRIPTION OF THE EMBODIMENT(S)

Figure 1:
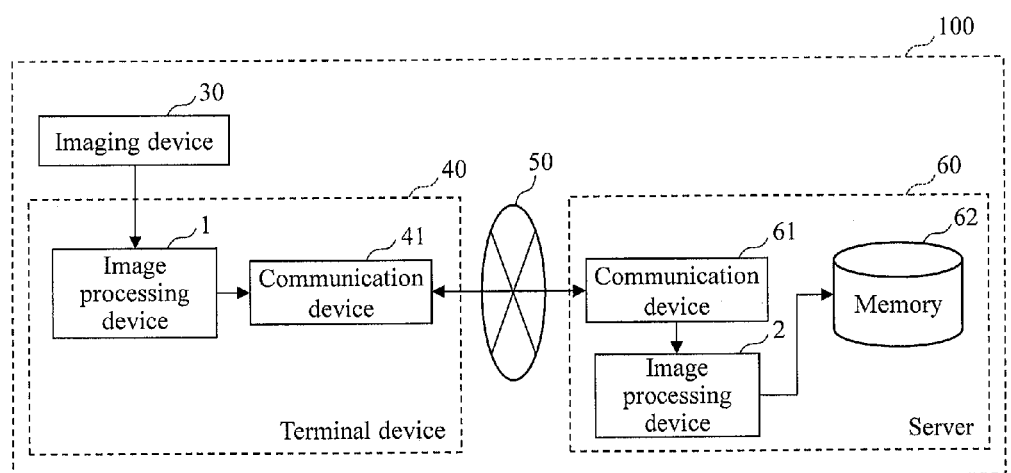
FIG. 1 is a block diagram showing a schematic configuration of an object detection system in accordance with an embodiment of the present invention.

The embodiments of the present invention relate to an object detection technique for detecting an object contained in a video, which has been captured with an imaging device such as a smartphone mounted on a running vehicle, for example, transmitting the detected object to a server, and recognizing the object on the server side.

Typically, in order to detect accessories on the road as additional information of map information and the like, it is necessary to drive a vehicle along all of the routes and capture images of the accessories on the road, which involves a high research cost. Meanwhile, it is impossible to reflect accessories on a newly constructed road or on a road that has been changed through construction in the map information on a timely basis. Thus, the embodiments of the present invention allow for the detection of accessories on the road on a timely basis using images captured by a plurality of (i.e., an indefinite number of) smartphone users, and also allow for a reduction in the amount of data transmitted over a mobile network.

By the way, when a video captured with a smartphone is transferred to a server, there is a problem in that video data cannot be efficiently collected from an indefinite number of users due to the restrictions on the upper limit of the data communication amount. That is, when a video captured with a terminal device of each user is transmitted to a server as it is, there is a high possibility that the amount of data communicated may reach the upper limit soon, and images that are necessary and sufficient may not be able to be collected from each user. Further, a video captured with a smartphone contains a variety of objects, and such objects may appear to be continuous due to block noise and the like, which is problematic in that the boundary between the contours of the objects become unclear, and thus, accessories (e.g., signs) on the road in the background cannot be detected. In particular, when a video captured with a smartphone is transmitted, some of the counters (i.e., vertical lines, horizontal lines, and characters) in an image may become unclear depending on videos. Thus, in Patent Document 1 above, it is impossible to separate the background of an image and an object in the background and thus detect the object in the background even when the average value of the color in an image or edge information is used for each image.

Thus, in the embodiments of the present invention, a target object (i.e., an object that appears to be a road sign) is simply detected on a terminal device 40 side (i.e., a candidate object that appears to be a target object is detected on the basis of a criterion (i.e., a first evaluation criterion) for distinguishing between (separating) the target object and the background), and only the images (i.e., frames) that contain the target object (i.e., the candidate object) are transmitted to a server from the terminal device. As only the images that contain the target object are transmitted to the server, it is possible to suppress the data communication amount of the terminal device of each user to be relatively small, and efficiently collect many pieces of necessary data from each user. Meanwhile, such simple target object detection may partially involve erroneous detection. Thus, the images received from the terminal device are closely examined on a server 60 side (i.e., the target object is identified and recognized on the basis of a criterion (i.e., a second evaluation criterion) for recognizing what is the target object) to recognize the target object. Accordingly, it is possible to efficiently detect a desired target object and reduce the data communication amount (i.e., achieve both efficient detection of a target object and a reduction in the data communication amount).

That is, according to the embodiments of the present invention, there is provided an objection detection system as well as a method therefor where, even when the lightness of an image contained in a video changes, or even when some of counters in an image become unclear due to block noise and the like resulting from image compression, the background of the image and an object in the background are efficiently separated so as to allow for simple detection of the target object in the background, and then, only the images that contain the detected object are transmitted to the server so that the target object in the received images is accurately recognized on the server 60 side.

It should be noted that the terminal device need not transmit to the server all of images that contain a target object if the positional information (GPS information) on the images are the same. For example, when a vehicle is stopping at a red light, images that are captured remain unchanged for a given period of time. Thus, it is not necessary to transmit all of the captured images (i.e., images that contain a target object) to the server, and it is acceptable as long as at least 1 frame of such images is transmitted. There are also many cases where there is no change in images that contain a target object to be detected even when the positional information has changed a little. In such a case also, it is acceptable as long as only a representative image is transmitted to the server.

Hereinafter, the embodiments of the present invention will be described with reference to the accompanying drawings. In the accompanying drawings, elements that have the same function may be indicated by the same number. Although the accompanying drawings show specific embodiments and implementations in accordance with the principle of the present invention, such drawings should be used only for the understanding of the present invention and should never be used to narrowly construe the present invention.

The following embodiments contain a fully detailed description for one of ordinary skill in the art to carry out the present invention. However, it should be appreciated that other implementations and embodiments are also possible, and changes in the configuration and the structure as well as replacement of a variety of elements is also possible within the spirit and scope of the present invention. Thus, the present invention should not be construed in a manner limited to the following description.

Further, as described below, the embodiments of the present invention may be implemented by software that runs on the general-purpose computer or may be implemented by dedicated hardware or by a combination of software and hardware.

Hereinafter, each process in the embodiments of the present invention will be described on the assumption that "each processing unit (e.g., a lightness/darkness correction unit) as a program" is a subject (i.e., a subject that performs an operation). However, each process may also be described on the assumption that a processor is a subject because a predetermined process is performed with a memory and a communication port (i.e., a communication control device) upon execution of a program with a processor (i.e., a CPU).

(1) First Embodiment

<Functional Configuration of the Object Detection System>

FIG. 1 is a block diagram showing the functional configuration of an object detection system in accordance with an embodiment of the present invention. An object detection system 100 includes an imaging device 30, a terminal device 40, and a server 60. The terminal device 40 and the server 60 are connected over a network 50. The terminal device 40 includes an image processing device 1 and a communication device 41. The server 60 includes an image processing device 2, a communication device 61, and a memory (i.e., a storage device) 62.

The imaging device 30 outputs a captured video to the image processing device 1. It should be noted that when the terminal device 40 has a positional information acquisition function, such as a GPS function, each image (per frame) of the captured video may be provided with positional information and be stored into a memory 90 of the image processing device 1.

The image processing device 1 determines whether or not the video contains an object to be detected (which is also referred to as a "target object" or a "candidate object"), and outputs only the images that contain the object to be detected to the communication device 41.

The communication device 41 transmits only the images that contain the object to be detected to the communication device 61 on the server 60 side over the network 50 such as a mobile network.

The communication device 61 receives the images transmitted from the communication device 41 of the terminal device, and outputs the images to the image processing device 2 on the server 60 side.

The image processing device 2 recognizes the object from the received images, and stores information on the recognition results (i.e., the images and the positional information in the images) into the memory 62.

As described above, the object detection system 100 in this embodiment is characterized in that only the images detected with the image processing device 1 on the terminal device 40 side are transmitted to the server 60 side using the communication device 41 so that the images are received by the communication device 61 on the server 60 side, and then, the object is recognized from the received images by the image processing device 2 on the server 60 side.

<Summary of the Process of the Object Detection System>

Figure 12:
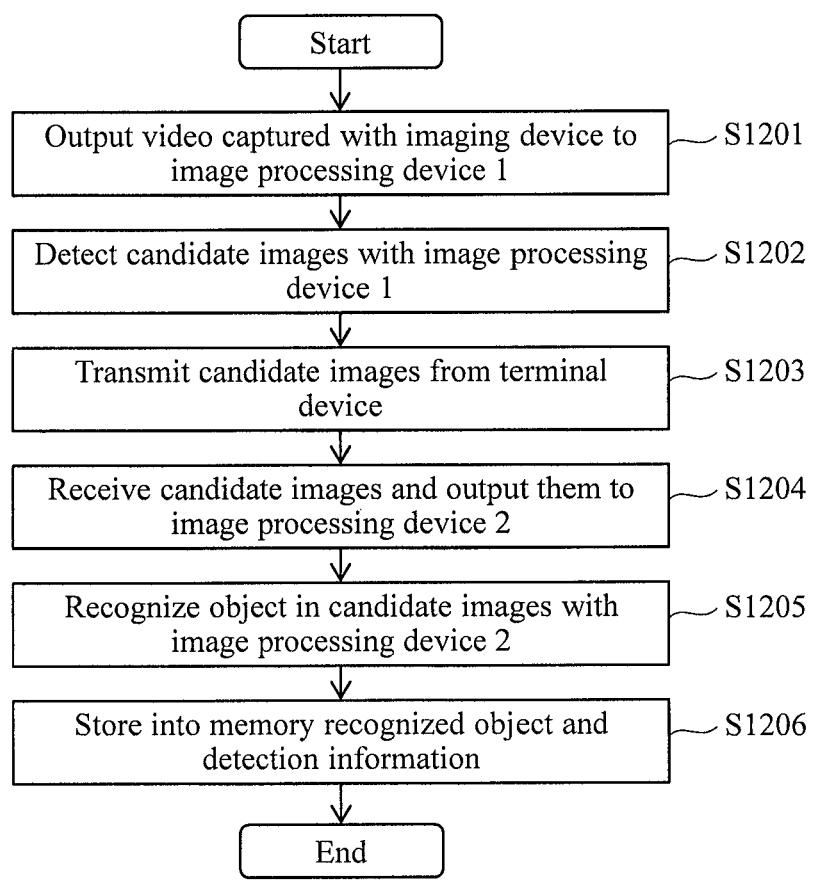
FIG. 12 is a flowchart illustrating a summary of the process of the object detection system in accordance with an embodiment of the present invention.

FIG. 12 is a flowchart illustrating a summary of the process of the object detection system in accordance with an embodiment of the present invention.

(i) Step 1201

The imaging device 30 captures a video from a vehicle using a camera of a smartphone and the like, and outputs the video to the image processing device 1.

(ii) Step 1202

The image processing device 1 detects from the video candidate images that contain a target to be detected.

(iii) Step 1203

The communication device 41 transmits the detected candidate images to the server from the terminal device.

(iv) Step 1204

The communication device 61 receives the candidate images transmitted from the terminal device, and outputs the received images to the image processing device 2.

(v) Step 1205

The image processing device 2 creates histograms for a reference image and each of the received images, and determines the similarity between the two histograms to recognize the object in the candidate image.

(vi) Step 1206

The recognized object and the detection information are stored into the memory 62.

<Functional Configuration and a Summary of the Operation of the Image Processing Device 1>

Hereinafter, the configuration and the operation of the image processing device 1 will be described in detail.

Figure 2:
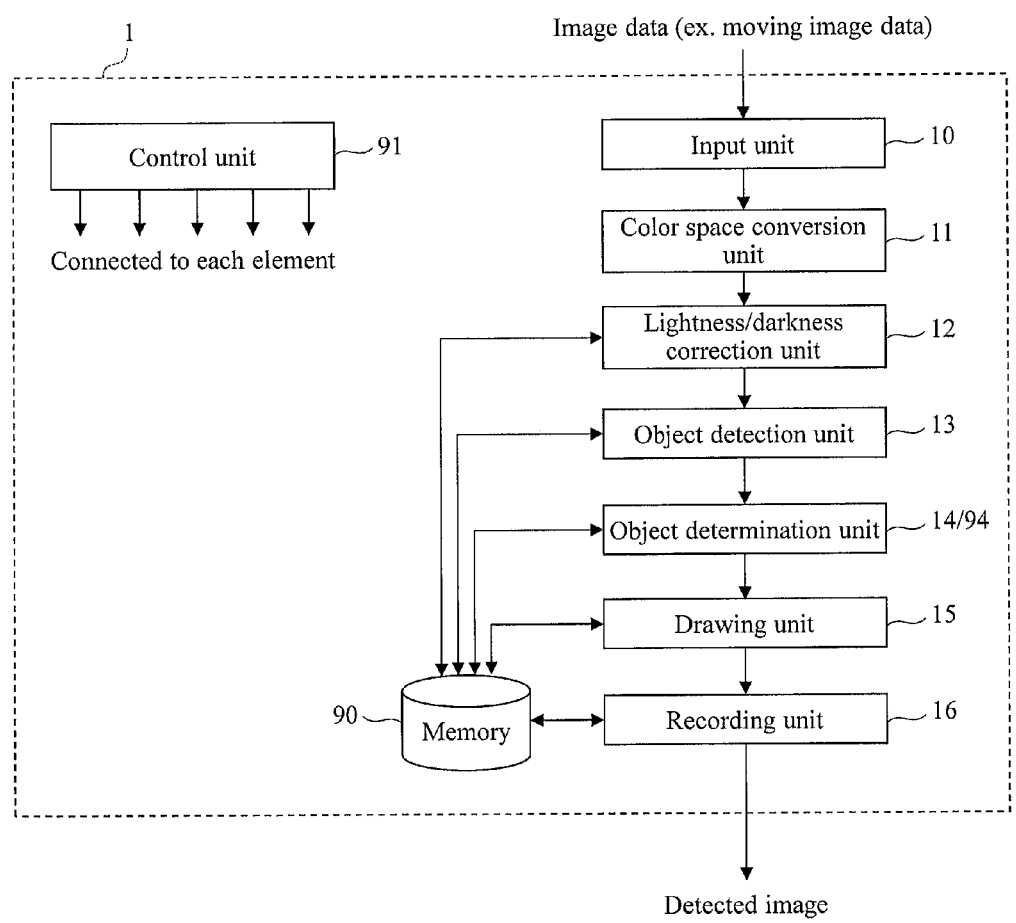
FIG. 2 is a block diagram showing the function of an image processing device in accordance with an embodiment of the present invention.

FIG. 2 is a block diagram showing the functional configuration of the image processing device 1 in accordance with an embodiment of the present invention. The image processing device 1 includes an input unit 10, a color space conversion unit 11, a lightness/darkness correction unit 12, an object detection unit 13, an object determination unit 14, a drawing unit 15, a recording unit 16, a memory 90, and a control unit 91. FIG. 2 represents the object determination unit 14/94 because, although the image processing device 1 and the image processing device 2 have almost the same configuration, they differ only in the processing operation of the object determination unit (however, the image processing device 2 on the server 60 side need not necessarily execute a color space conversion process or a lightness/darkness correction process as described below). The object determination unit 14 is included in the image processing device 1, and the object determination unit 94 is included in the image processing device 2.

Each of the input unit 10, the color space conversion unit 11, the lightness/darkness correction unit 12, the object detection unit 13, the object determination unit 14, the drawing unit 15, and the recording unit 16 in the image processing device 1 may be implemented by a program or may be implemented as a module. The same is true of the image processing device 2.

The input unit 10 receives moving image data. For example, the input unit 10 may receive, as input images, images of still image data and the like encoded in JPG, Jpeg 2000, PNG, or BMP format, for example, that have been captured at predetermined time intervals by an imaging means, such as a smartphone or a drive recorder, shown as the imaging device 30. Alternatively, the input unit 10 may receive, as input images, images obtained by extracting still image data of frames at predetermined intervals from moving image data in Motion JPEG, MPEG, H.264, or HD/SDI format, for example. As a further alternative, the input unit 10 may receive, as input images, images acquired by an imaging means via a bus, a network, and the like. In addition, the input unit 10 may also receive, as input images, images that have been already stored in a detachable recording medium.

The color space conversion unit 11 creates an image by converting the color space of the input image.

The lightness/darkness correction unit 12 determines a variation in the lightness of the color of the current image using the lightness information on the color of an image, which has been captured in the past, stored in the memory 90 and the lightness information on the color of the current image, and creates a lightness/darkness-corrected image using the variation in the lightness.

The object detection unit 13 determines a threshold for separating a target object from the lightness/darkness-corrected image, and actually separates the background of the image and the object in the background using the threshold, and thus detects the object in the background.

The object determination unit 14 determines whether or not the detected object is the target object to be detected. If the object determination unit 14 determines that the target object is included, the object determination unit 14 stores the image containing the target object into the memory 90.

The drawing unit 15 draws a detection frame on the image such that the detection frame surrounds the object detected with the object detection unit 13.

The recording unit 16 stores positional information for drawing the detection frame on the original image with the drawing unit 15 as well as the image into the memory.

The control unit 91 is implemented by a processor, for example, and is connected to each element in the image processing device 1. The operation of each element in the image processing device 1 is the autonomous operation of each element described above or is instructed by the control unit 91.

As described above, in the image processing device 1 in this embodiment, the proportion of enhancement of the lightness/darkness of each image is changed using the color-space-converted image obtained by the color space conversion unit 11 and a variation in the lightness (i.e., the lightness of the color) of the image calculated by the lightness/darkness correction unit 12. In addition, the object detection unit 13 determines a threshold from the lightness/darkness-corrected image, and separates the background of the image and the object in the background using the threshold so as to detect the target object in the background. Further, the object determination unit 14 determines whether or not the detected object is the target object to be detected, and only the images that contain the target object to be detected are transmitted to the server.

<Hardware Configuration of the Image Processing Device 1>

Figure 3:
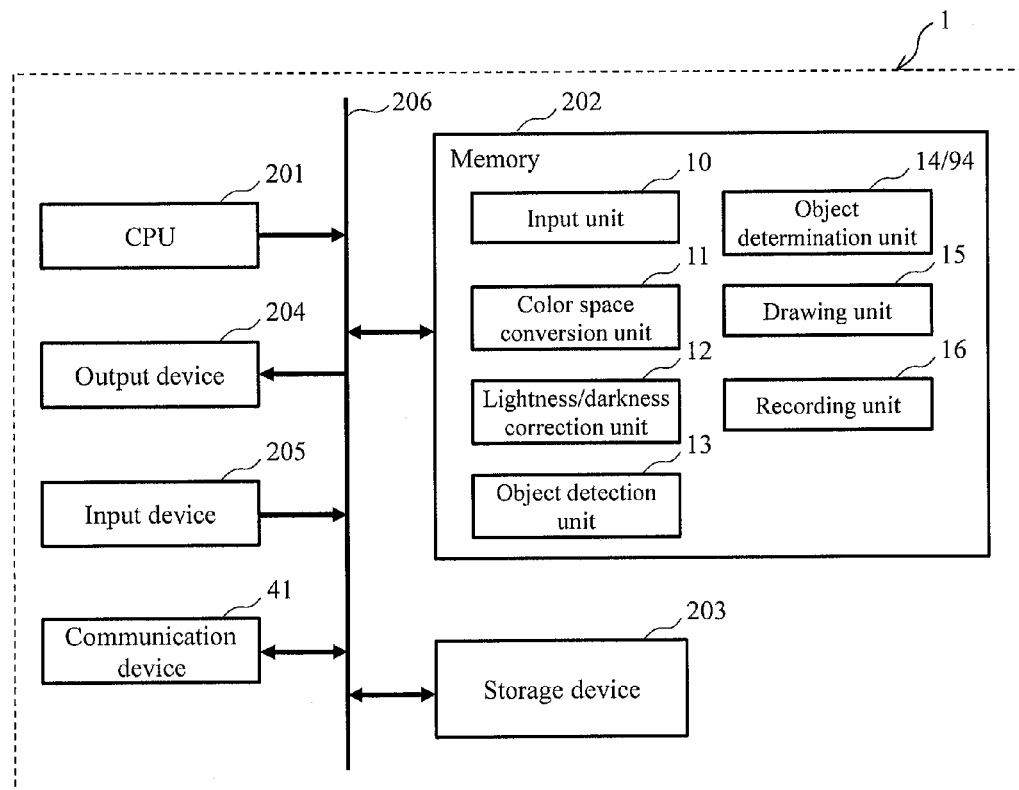
FIG. 3 is a diagram showing an exemplary hardware configuration of an image processing device in accordance with an embodiment of the present invention.

FIG. 3 is a diagram showing an exemplary hardware configuration of the image processing device 1 in accordance with an embodiment of the present invention. It should be noted that FIG. 3 also represents the object determination unit 14/94 because, although the image processing device 1 and the image processing device 2 have almost the same configuration, they differ only in the processing operation of the object determination unit. The object determination unit 14 is included in the image processing device 1, and the object determination unit 94 is included in the image processing device 2.

The image processing device 1 includes a CPU (i.e., a processor) 201 that executes a variety of programs, a memory 202 that stores a variety of programs, a memory device (i.e., a storage device; which corresponds to the memory 90) 203 that stores a variety of data, an output device 204 for outputting detected images, and an input device 205 for receiving instructions from a user, images, and the like. Such components are mutually connected via a bus 206.

The CPU 201 reads a variety of programs from the memory 202 and executes the programs as appropriate.

The memory 202 stores as programs the input unit 10, the color space conversion unit 11, the lightness/darkness correction unit 12, the object detection unit 13, and the object determination unit 14.

The storage device 203 stores images (i.e., images of up to an image N−1 (a frame N−1) described below) captured in the past, prior to the target image to be processed (i.e., an image N (a frame N) described below), each pixel value of an image generated by the lightness/darkness correction unit 12, a threshold calculated for each image, and the like.

The output device 204 includes devices such as a display, a printer, and a speaker. For example, the output device 204 displays data generated by the drawing unit 15 on a display screen.

The input device 205 includes devices such as a keyboard, a mouse, and a microphone. An instruction from a user (which includes decision of a target image to be processed) is input to the image processing device 1, for example, by the input device 205.

The communication device 41 executes an operation of acquiring data from the storage device 203 and transmitting the data to another device (i.e., a server) connected to the communication device 41 over a network, and executes an operation of receiving transmitted data (which includes images) and storing them into the storage device 203, for example.

<Operation (Details) of Each Unit of the Image Processing Device 1>

Hereinafter, the configuration and the operation of each element will be described in detail.

(i) Color Space Conversion Unit 11

The color space conversion unit 11 generates an image by converting an RGB color space of an input image into a Lab color space, for example. Through conversion into the Lab color space, the L value, the a value, and the b value of the image are acquired. The L value represents information like lightness, and the a value and the b value represent color information.

(ii) Lightness/Darkness Correction Unit 12

Figure 4:
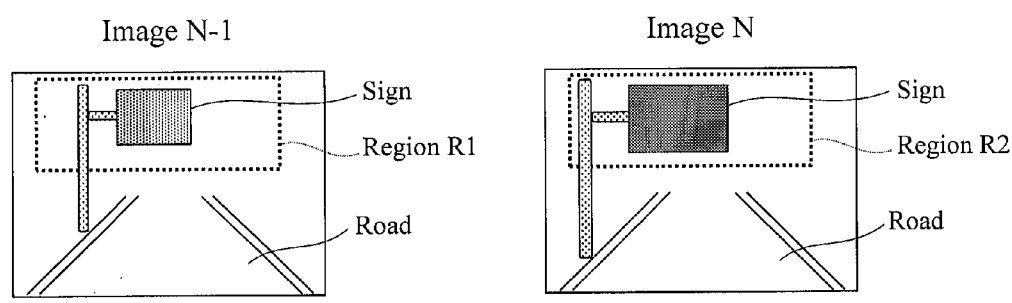
FIG. 4 is a diagram illustrating an example of the operation of a lightness/darkness correction unit 12.

FIG. 4 is a diagram illustrating an example of the operation of the lightness/darkness correction unit 12. Provided that the image N whose color space has been converted into a Lab color space by the color space conversion unit 11 is represented by an image NA, the lightness/darkness correction unit 12 calculates the average value aveR2 of the color information (i.e., the lightness of the color: the a value or the b value) in a region R2 of the image NA using the color information (i.e., the a value or the b value) of the image NA. In addition, the lightness/darkness correction unit 12 reads the average value aveR1 of the lightness of the color in a region R1 of the image N−1 from the memory 90 (i.e., a storage device; which corresponds to the storage device 203).

Next, the lightness/darkness correction unit 12 calculates the average value aveRN by blending the average value aveR1, which has been obtained by blending the average value of the lightness of the color (i.e., the a value or the b value) of the images of up to the image N−1 captured in the past, and the average value aveR2 of the lightness of the color of the image NA. It should be noted that in Formula 1, C1=C2+C3. Herein, when a change in the lightness of the color from the images captured in the past is to be made gentle, the weight C2 for the images captured in the past may be increased, while when a change in the lightness of the color of the current image is to be made significantly large, the weight C3 for the current image may be increased. However, if C3 is increased too much to emphasize only the current image, it may be impossible to accurately correct the lightness/darkness. Thus, it is necessary to take the images captured in the past into consideration to a certain degree (the weight C2 should not be set too small). For example, when a change in the lightness of the color from the images captured in the past is to be made gentle, C2 is set to 0.9, and C3 is set to 0.1. Meanwhile, when a change in the lightness of the color of the current image is to be made significantly large, setting each of C2 and C3 to 0.5 is considered.

$$aveRN = aveR1 \times C2/C1 + aveR2 \times C3/C1 \quad \text{[Formula 1]}$$

In addition, the lightness/darkness correction unit 12 calculates the magnification value v using Formula 2 below. It should be noted that when the value of aveR1 is greater than or equal to the value of aveR2 in Formula 2, E1 is set to aveR2 and E2 is set to aveR1, while when the value of aveR1 is smaller than the value of aveR2, E1 is set to aveR1 and E2 is set to aveR2. However, the magnification value v may also be a fixed value.

$$v = E2/E1 \quad \text{[Formula 2]}$$

Further, the lightness/darkness correction unit 12 corrects the image NA using Formula 3 below such that a pixel that is darker than the average value of the lightness of the color in the region R2 of the image NA becomes even darker, and a pixel that is lighter than the average value of the lightness of the color in the region R2 of the image NA becomes even lighter. Such correction allows an object, which may otherwise be buried in the input image and thus be difficult to be noticed, to be easily detected. It should be noted that in Formula 3, cn represents the a value or the b value of each pixel of the image NA.

$$cnCor = cn - (aveR2 - cn) \times v \quad \text{[Formula 3]}$$

The lightness/darkness correction unit 12 determines the cnCor value for each pixel, and creates an image NB by correcting the lightness/darkness of the image NA.

It should be noted that in this embodiment, the regions R1 and R2 in FIG. 4 are represented as fixed regions for the sake of simplicity because a target object to be detected, such as a sign, is often located in the upper portion of an image. However, the searched region may be set in the entire region of the screen. However, limiting the search region to only a partial region can reduce the processing load on the terminal device.

(iii) Object Detection Unit 13

The object detection unit 13 determines a threshold Th for each image using Formula 4 below.

$$Th = aveRN + \alpha \quad \text{[Formula 4]}$$

Herein, α represents the value for correcting the threshold in the case of extracting only lighter pixels or only darker pixels, and is a parameter for cutting out a target object more easily.

When each pixel of the image NA has the a value, the object detection unit 13 uses the threshold Th determined for each image with α as a positive value so as to set each pixel value to the s value (e.g., s=255) if each pixel value≥Th, and set each pixel value to the t value (e.g., t=0) if each pixel value<Th, and creates an image in which the background and the object are separated. Accordingly, it becomes possible to efficiently separate a lighter object. Alternatively, when each pixel of the image NA has the b value, the object detection unit 13 uses the threshold Th determined for each image with α as a negative value so as to set each pixel value to the s value (e.g., s=255) if each pixel value≤Th, and set each pixel value to the t value (e.g., t=0) if each pixel value>Th, and creates an image in which the background and the object are separated. Accordingly, it becomes possible to efficiently separate a darker object.

Thus, the process of the object detection unit 13 can, for the region R2 of the image N in FIG. 5, for example, separate the background and the object as shown in an image ND after the detection of the object.

(iv) Object Determination Unit 14

Determining the lightness/darkness-corrected image based on a threshold can identify an object that appears to be a sign (i.e., a target object) to a certain degree and thus extract the object. However, without any further process, there is a possibility that an object that is not a sign but is similar to a sign (e.g., an object such as a billboard set around a road) may also be extracted. Therefore, in order to more accurately extract an object that appears to be a target object (i.e., a sign), the object determination unit 14 is configured to execute an ellipse detection process as described below. As erroneous detection (i.e., detection of a similar object as a target object) can be prevented in advance, the amount of data can be reduced.

The object determination unit 14 determines whether or not a detected object is a target object to be detected. In such a case, the object determination unit 14 converts an image of the detected region on the image N into an edge image, for example, and determines whether or not an ellipse can be constructed from a set of the pixel values of the edge image as shown in FIGS. 6A to 6F, using the probabilistic Hough transform. That is, the probabilistic Hough transform detects a circle by voting the center position of the circle. Thus, the threshold to be voted is set to a small value (e.g., 35) to detect an ellipse. It should be noted that a video captured with a smartphone and the like contains a variety of objects, and the contours of such objects overlap one another. Thus, even when the Probabilistic Hough Transform is performed on an edge image of the entire image, it is impossible to detect an ellipse. Alternatively, a variety of textures may be detected as an ellipse, and a region of an object cannot thus be determined. However, as a region of an object has already been identified by the object detection unit 13, using only an image of that region can detect an ellipse with the object determination unit 14. Thus, for example, a quadrangular billboard or sign in FIG. 6A can be detected as an ellipse shown in FIG. 6B. In addition, a triangular billboard or sign in FIG. 6C can be detected as an ellipse shown in FIG. 6D. Likewise, a circular billboard or sign in FIG. 6E can be detected as an ellipse shown in FIG. 6F. That is, even when a detected object image has degraded or deformed and thus has partly missing information on the object, it is possible to detect an image that contains a target object to be detected because an ellipse is estimated using the edge information on the object in the detected limited region. Then, the object determination unit 14 determines the latitude and the longitude from the GPS information at a time point when the image of the detected object was captured, and stores the positional information and the image into the memory 90 (which corresponds to the storage device 203). It should be noted that the object determination unit 14 does not store duplicated images, which have been captured at the same latitude and longitude, into the memory 90. Accordingly, it is possible to suppress the detection of duplicated images captured while a vehicle was stopping at a red light, for example.

(v) Drawing Unit 15

Figure 7:
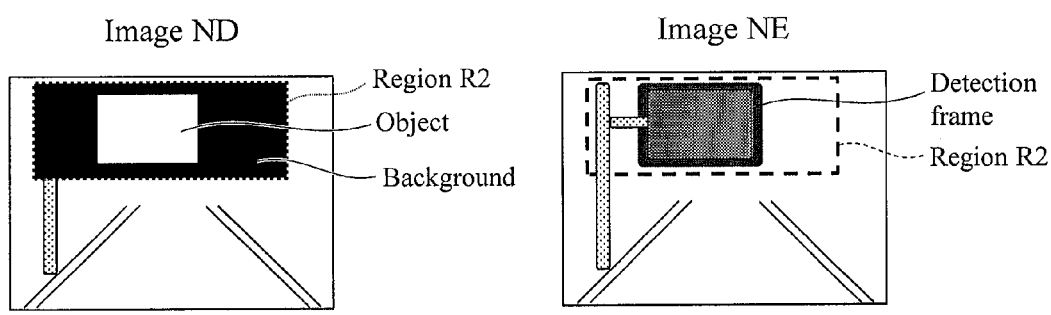
FIG. 7 is a diagram illustrating an example of the operation of a drawing unit 15.

The drawing unit 15, as shown in FIG. 7, draws a detection frame on the image N in FIG. 4 such that the frame surrounds the object detected with the object detection unit 13 (see the image NE).

(vi) Recording Unit 16

The recording unit 16 stores an image, which has been obtained by drawing a detection frame on the original image N with the drawing unit 15, into the memory 90. It should be noted that the recording unit 16 does not store images that have the same positional information (e.g., GPS data) as the original image N (i.e., a plurality of images captured while a vehicle, such as an automobile with the terminal device 40 mounted thereon, was stopping, for example) into the memory 90 even when it is determined that such images contain a target object, or does not select such images as the data to be transmitted to the server 60 even when the recording unit 16 stores such images into the memory 90. Further, there are also cases where a plurality of images (i.e., frames) contains the same target object even when such images have a slight time difference. Thus, when a target object is detected from a plurality of images (i.e., frames) within predetermined time intervals, at least one of the images may be selected as the image to be transmitted to the server 60. Accordingly, the data communication amount can be further reduced. It should be noted that when a more elaborate lightness/darkness correction process is to be executed on the server side 60 using images captured in the past, it is also possible to transmit to the server 60 images of several frames captured before and after the candidate image was captured.

The communication device 41 transmits to the server 60 only the images that contain the target object to be detected (i.e., the object detected as an ellipse by the object determination unit 14) stored in the memory 90.

<Process of the Image Processing Device 1>

Figure 8:
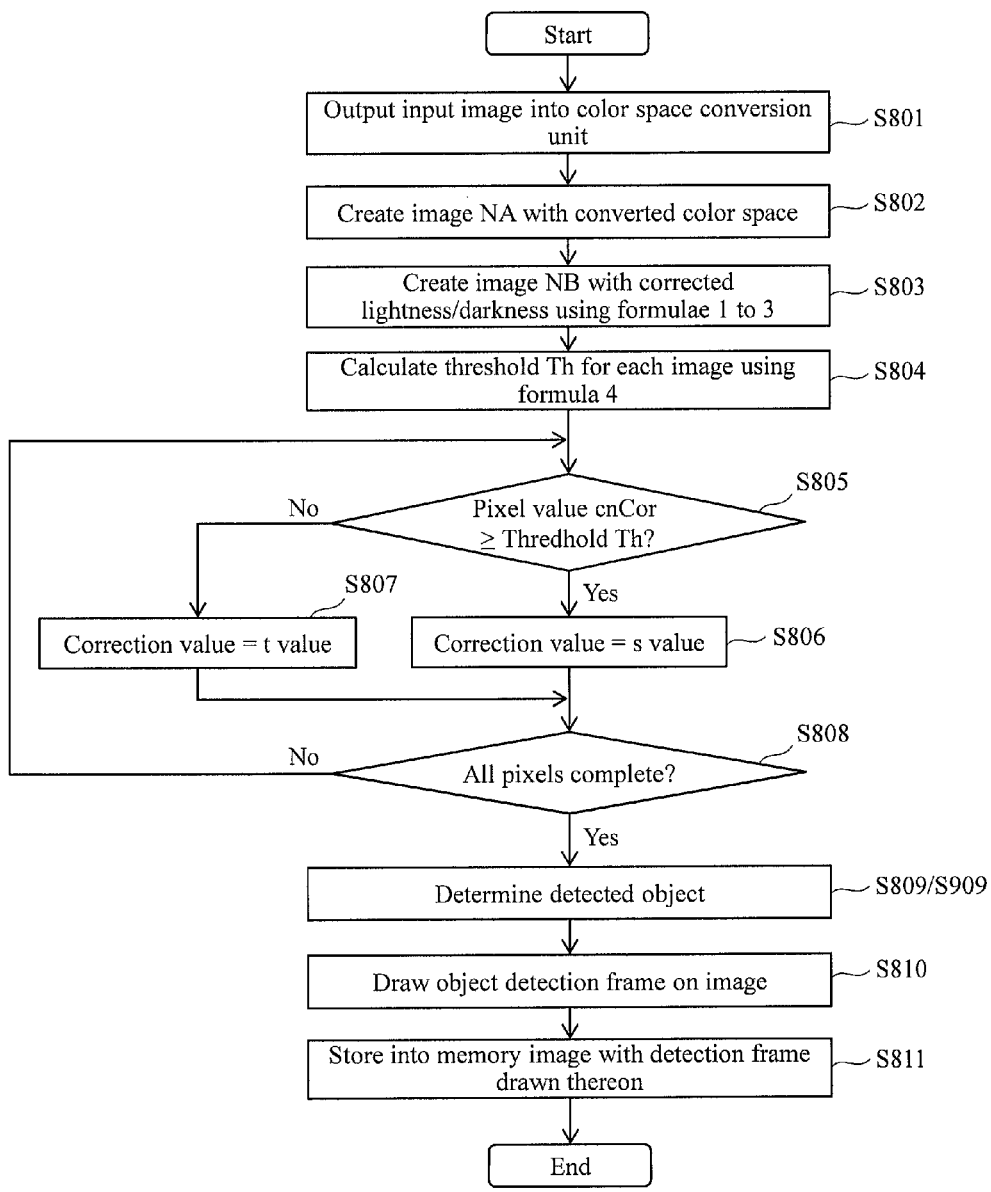
FIG. 8 is a flowchart illustrating the operation of an image processing device.

FIG. 8 is a flowchart illustrating the operation of the image processing device 1 in accordance with an embodiment of the present invention. Although the following description is made on the assumption that each processing unit (i.e., the input unit 10 or the color space conversion unit 11) is a subject that performs an operation, the description may also be read on the assumption that the CPU 201 is a subject that performs an operation and the CPU 201 executes each processing unit as a program.

(i) Step 801

The input unit 10 receives an input image, and outputs the input image to the color space conversion unit 11.

(ii) Step 802

The color space conversion unit 11 obtains an image NA by converting the image N output from the input unit 10, that is, an RGB color space image into a Lab color space image, for example.

(iii) Step 803

The lightness/darkness correction unit 12 calculates from the image NA obtained by the color space conversion unit 11 the average value aveR2 of the lightness of the color in the region R2 of the image N. In addition, the lightness/darkness correction unit 12 reads the average value aveR1 of the lightness of the color in the region R1 of the image N−1 (i.e., an image captured immediately before the image N) from the memory 90. Then, the lightness/darkness correction unit 12 generates a lightness/darkness-corrected image NB using Formulae 1 to 3 above.

(iv) Step 804

The object detection unit 13 determines the threshold Th for each image using Formula 4 above.

(v) Step 805

The object detection unit 13 compares each pixel value cnCor of the lightness/darkness-corrected image NB with the threshold Th. That is, when each pixel of the image NB has the a value, if cnCor≥threshold Th, the process proceeds to step 806. Meanwhile, if cnCor<threshold Th, the process proceeds to step 807. It should be noted that when each pixel of the image NB has the b value, if cnCor≤threshold Th, the process proceeds to step 806. Meanwhile, if cnCor>threshold Th, the process proceeds to step 807.

(vi) Step 806

Regardless of whether each pixel of the image NB has the a value or the b value, the object detection unit 13 sets the correction value to the s value (e.g., 255).

(vii) Step 807

Regardless of whether each pixel of the image NB has the a value or the b value, the object detection unit 13 sets the correction value to the t value (e.g., zero).

(viii) Step 808

The object detection unit 13 repeats the steps of from steps 805 to 807 above until the correction values for all of the pixels in the target image are determined. Repeating the steps of from steps 805 to 807 can, for the region R2 of the image N in FIG. 5, for example, separate the background and the object as shown in the image ND after the detection of the object, for example.

(ix) Step 809

The object determination unit 14 converts an image of the region on the image N detected with the object detection unit 13 into an edge image, and determines whether or not an ellipse can be constructed from a set of the pixel values of the edge image, using the probabilistic Hough transform. If an ellipse can be estimated, it is determined that the object in the detected region is the target object to be detected. Then, the image that contains the target object to be detected is output to the communication device 41.

(x) Step 810

The drawing unit 15 draws a detection frame on the image N such that the detection frame surrounds the object detected with the object detection unit 13.

(xi) Step 811

The recording unit 16 stores the image, which has drawn thereon the object detection frame, into the memory 90 (which corresponds to the storage device 203).

The image transmitted from the communication device 41 on the terminal device 40 side is received by the communication device 61 on the server 60 side, and then, the communication device 61 outputs the received image to the image processing device 2 on the server 60 side.

<Functional Configuration and a Summary of the Operation of the Image Processing Device 2>

FIG. 2 is a block diagram that also shows the functional configuration of the image processing device 2 in accordance with an embodiment of the present invention. The image processing device 2 has a similar function to the image processing device 1, but the function of the object determination unit 94 differs from that of the object determination unit 14 of the image processing device 1. Hereinafter, the object determination unit 94 with a different function from the image processing device 1 will be described.

The object determination unit 94 closely examines the object detected with the object detection unit 13, and recognizes the object in the region. In addition, the object determination unit 94 stores the recognized image into the memory 90.

As described above, the image processing device 2 in this embodiment changes the proportion of enhancement of the lightness/darkness of each image using the color-space-converted image obtained by the color space conversion unit 11 and a variation in the lightness (i.e., the lightness of the color) of the image calculated by the lightness/darkness correction unit 12, and determines a threshold from the lightness/darkness-corrected image with the object detection unit 13 so as to separate the background of the image and the object in the background and thus detect the object in the background, and then identifies the detected object and recognizes the object in the region with the object determination unit 94.

It should be noted that the color space conversion process and the lightness/darkness correction process are not the essential processes in the image processing device 2. That is, the color space conversion unit 11 and the lightness/darkness correction unit 12 need not be necessarily provided. In such a case, the process of the object detection unit 13 and the process of the object determination unit 94 are executed using luminance information, for example. More specifically, the object detection unit 13 performs a process of setting a threshold related to the luminance, and the object determination unit 94 performs a process of calculating the similarity using histograms related to the luminance. However, executing a color space conversion process and a lightness/darkness correction process is advantageous in that a target object can be detected more accurately and thus recognized.

<Hardware Configuration of the Image Processing Device 2>

FIG. 3 is a diagram that also shows an exemplary hardware configuration of the image processing device 2 in accordance with an embodiment of the present invention. The image processing device 2 has a similar configuration to the image processing device 1, but the function of the object determination unit 94 in the memory 202 differs from that of the object determination unit 14. Hereinafter, the memory 202 and the storage device 203 with different configurations and operations from those of the image processing device 1 will be described.

The memory 202 stores as programs the input unit 10, the color space conversion unit 11, the lightness/darkness correction unit 12, the object detection unit 13, and the object determination unit 94.

The communication device 41 performs operations of receiving data (which includes images) transmitted from another device (e.g., a terminal device) connected thereto over a network, and storing the data into the storage device 203, for example.

<Configuration and Operation (Details) of the Image Processing Device 2>

Hereinafter, the configuration and the operation of the image processing device 2 that differ from those of the image processing device 1 will be described in detail. As described above, the image processing devices 1 and 2 differ in the function of the object determination unit. Thus, hereinafter, the operation of the object determination unit 94 will be described.

The object determination unit 94 executes a process of identifying what sign the object detected with the object detection unit 13 is. In such a case, the object determination unit 94 reads from the memory 90 a reference image (which is prepared in advance as a database and the like) of a target sign to be identified, and creates a histogram A (e.g., a histogram of the reference image) and a histogram B (a histogram of the detected image) for each of the reference image and the detected object image (which are compared as RGB images). Then, the object determination unit 94 calculates the similarity between the created histograms A and B to determine whether or not the detected object is the target sign to be identified (i.e., determines the similarity based on whether or not the shapes of the histograms are close (the Bhattacharyya distance is short)). To determine the similarity, B32(c) is first determined based on the Bhattacharyya distance between the two histograms for each of RGB, and the similarity R is calculated using B32(r) determined for the r components, B32(g) determined for the g components, and B32(b) determined for the b components. It should be noted that c herein represents one of r, g, or b.

$$B32(c) = \sqrt{1 - \frac{1}{HSUM}\sum_{I=0}^{31}\sqrt{HA(I) \times HB(I)}} \quad \text{[Formula 5]}$$

$R=\sqrt{B32(r)^2+B32(g)^2+B32(b)^2}$, where HA(I) represents the frequency of the gray-scale value I of the histogram A, and HSUM represents the total number of bins of the histogram.

As described above, calculating the similarity R between the two histograms can determine the similarity between the reference image and the detected object image. It is also possible to use histograms with a reduced number of gray scales as the histograms (e.g., 256 gray scales may be reduced to 128 gray scales). In such a case, it is possible to determine the similarity between the reference image and the detected object image while suppressing the influence of block distortion of an image with a low bit rate. That is, the similarity can be determined even when a detected object image has degraded. Further, it is also possible to add, to the determination of the similarity between the two histograms, identification of the detected object with a discriminator that has been created from the feature quantities of the images through machine learning that uses neural networks of the conventional art. That is, when there is a plurality of detected reference images that has been determined to have high similarity, which image is correct (is probable) as the detected object is identified with a discriminator that uses neural networks. Then, the object determination unit 94 determines the latitude and the longitude of the identified object from GPS information at a time point when the image of the object was captured, and stores the positional information and the image into the memory 90 (which corresponds to the storage device 203) and the memory 62 on the server 60 side.

<Process of the Image Processing Device 2>

FIG. 8 is a flowchart that also illustrates the operation of the image processing device 2 in accordance with an embodiment of the present invention. Hereinafter, description will be made on the assumption that a processing unit (i.e., the object determination unit 94) is a subject that performs an operation, but the description may also be read on the assumption that the CPU 201 is a subject that performs an operation and the CPU 201 executes each processing unit as a program. The image processing device 2 has similar steps to the image processing device 1, but step 809 is changed to step 909 below. Hereinafter, step 909 in which a process different from that of the image processing device 1 is performed will be described.

In step 909, the object determination unit 94 reads a reference image from the memory 90 (i.e., the storage device 203), and creates histograms for the detected object image and the reference image to calculate the similarity R using Formula 5 above. If the similarity R is high (i.e., similarity R≤threshold TH_R; the similarity R is calculated as the BHATTACHARYYA distance described above, which means that "high similarity=short distance"), the object determination unit 94 determines the detected object as the target sign to be recognized. As described above, it is also possible to determine whether or not the detected object is the target sign to be recognized by adding, to the aforementioned determination, a result of determination obtained with a discriminator determined through machine learning that uses neural networks.

In addition, the image containing the recognized object is stored into the memory 62.

According to an embodiment of the present invention, images that contain a target object to be detected are detected by the image processing device 1 on the terminal device 40 side, and only such images are transmitted to the server 60 side so that the object is identified from the received images by the image processing device 2 on the server 60 side. Thus, a desired target object can be detected and the data communication amount can be reduced.

According to the image processing device 1 of an embodiment of the present invention, aveR1, which is obtained by blending the average value of the lightness of the color of the images of up to the image N−1 captured in the past, and aveR2, which is the average value of the lightness of the color of the target image N to be processed, are used to create an image NB with the corrected lightness/darkness of the image N, and a threshold Th is determined for each image NB. Thus, with the threshold Th, it is possible to separate the background of the image N and the object in the background and thus detect an image that contains the target object to be detected.

According to the image processing device 2 of an embodiment of the present invention, the similarity between a detected object and a target sign to be identified is determined. Thus, the detected object can be recognized more accurately.

In addition, according to the image processing device 2 of an embodiment of the present invention, histograms with a reduced number of gray scales are used to determine the similarity between a detected object and a target sign to be identified. Thus, it is possible to suppress the influence of block noise contained in an image with a low bit rate and thus recognize the detected object even when the contour of the object in the image is unclear.

As described above, an image, which is obtained by enhancing the lightness/darkness of a target image, is created using the lightness information on the images captured in the past and the target image, and a threshold for separating regions in each image is determined. Thus, even when the lightness of an image contained in a video changes depending on the traveling direction of a moving vehicle, it is possible to separate the background of the image and an object in the background and thus detect the object in the background, and detect only the images that contain the target object to be detected. In addition, it is also possible to suppress the data communication amount of a smartphone and the like, detect an object from images received on the server 60 side, and recognize the detected object. Further, it is also possible to, by detecting images that contain a target object to be detected from videos of in-vehicle smartphones captured by an indefinite number of users, transmitting the images to the server 60 side, and recognizing the object from the images received on the server side 60, detect accessories on a newly constructed road or on a road that has been changed through construction on a timely basis.

(2) Second Embodiment

Figure 9:
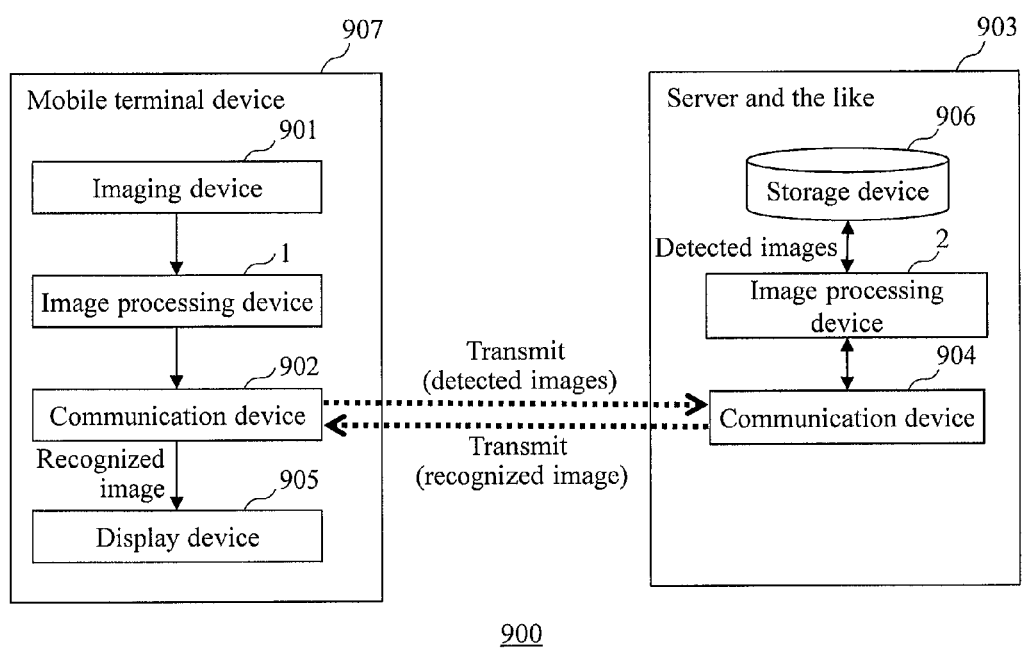
FIG. 9 is a diagram showing a schematic configuration of a POI information creation system in accordance with the second embodiment of the present invention.

FIG. 9 is a functional block diagram showing the configuration of a POI (Point of Interest) information creation system 900 in accordance with the second embodiment of the present invention. The POI information creation system 900 includes a server 903 and a mobile terminal device 907.

The mobile terminal device 907 is a device like a smartphone, for example, and includes an imaging device 901 that captures image data, the image processing device 1 that simply detects from the image data images that contain a target to be detected, a communication device 902 that transmits the detected images to the server 903 and the like, and a display device 905 that displays a recognized image transmitted from the server 903 and the like. Herein, the imaging device 901 may include a CMOS sensor or a CCD camera, for example. The image processing device 1 corresponds to the image processing device 1 in the terminal device 40 described in the first embodiment. The communication device 902 corresponds to the communication device 41 in the aforementioned terminal device 40.

The server and the like 903 include a communication device 904 that receives the image data transmitted from the mobile terminal device 907, the image processing device 2 that performs image processing in accordance with the first embodiment of the present invention (i.e., image processing for closely examining whether or not a detected object is a target object and recognizing the object) on the received image data, and a storage device (e.g., a memory or a storage device) 906 that stores the recognized image output from the image processing device 2. Herein, the communication device 904 corresponds to the communication device 61 of the server 60 described in the first embodiment. The image processing device 2 corresponds to the image processing device 2 in the aforementioned server 60.

The image processing device 2 recognizes an object, such as an accessory on the road, from the image data captured with the imaging device 901. The image processing device 2 sets a specific billboard, such as facility information or spot information, on a reference image so as to recognize the specific billboard from the image data.

The communication device 904 transmits the recognized image of the specific billboard and the like to the communication device 902 of the mobile terminal device 907.

The communication device 902 transmits the recognized image of the specific billboard and the like to the display device 905.

The display device 905 displays the recognized image of the specific billboard and the like transmitted from the server and the like 903 on a display screen of the mobile terminal device (e.g., smartphone) 907. More specifically, the display device 905 displays information (i.e., a mark) that indicates the presence of the identified target object on the map information displayed on the screen, for example.

According to the second embodiment, it is possible to provide a POI information creation system by recognizing a specific billboard from a video captured with an in-vehicle smartphone and storing a set of the recognized image of the specific billboard and the positional information thereon.

(3) Third Embodiment

Figure 10:
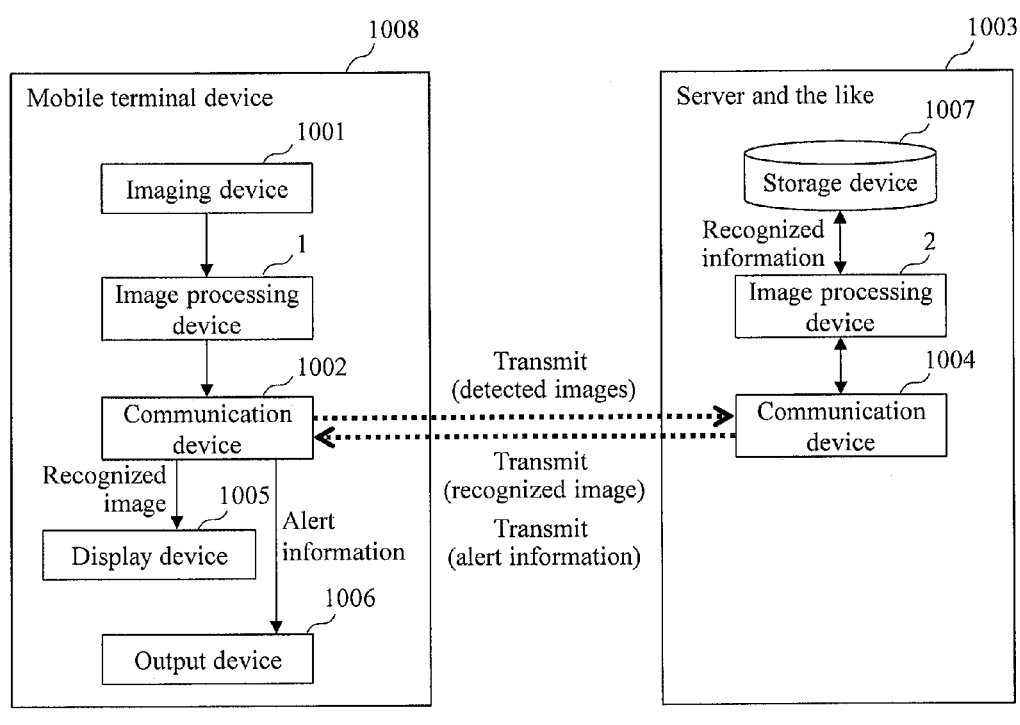
FIG. 10 is a diagram showing a schematic configuration of a warning system in accordance with the third embodiment of the present invention.

FIG. 10 is a block diagram showing the configuration of a warning system 1000 in accordance with the third embodiment of the present invention. The warning system 1000 includes a server and the like 1003 and a mobile terminal device 1008. The warning system 1000, for example, guides a user along a route to a destination on a map (i.e., a navigation system), collects information on a target object, such as a sign, from the user in real time, and outputs a warning (i.e., an alert) when the user has come close to a place of a predetermined mark (i.e., displays information to that effect on the screen or outputs such information via audio). It should be noted that the predetermined mark herein may be a predetermined place (e.g., a general-purpose building, such as a city hall or a police station, or a building that serves as a landmark), or a place marked by the user while driving a vehicle in the past. The system in accordance with the third embodiment provides useful information for a user while collecting (soaking up) information from the user.

The mobile terminal device 1008 is a device like a smartphone, for example, and includes an imaging device 1001 that captures image data, the image processing device 1 that simply detects from the image data images that contains a target to be detected, a communication device 1002 that transmits data to and receives data from the server and the like 1003, a display device 1005 that displays a recognized image transmitted from the server and the like 1003, and an output device 1006 that outputs alert information transmitted from the server and the like 1003. Herein, the imaging device 1001 may include a CMOS sensor or a CCD camera, for example. The image processing device 1 corresponds to the image processing device 1 in the terminal device 40 described in the first embodiment. The communication device 1002 corresponds to the communication device 41 in the aforementioned terminal device 40.

The server and the like 1003 include a communication device 1004 that receives the image data transmitted from the mobile terminal device 1008 or transmits the recognized image data or alert information to the mobile terminal device 1008, the image processing device 2 that performs image processing in accordance with the first embodiment of the present invention (i.e., image processing for closely examining whether or not a detected object is a target object and recognizing the object) on the received image data, and a storage device (e.g., a memory or a storage device) 1007 that stores the recognized image and the like output from the image processing device 2. Herein, the communication device 1004 corresponds to the communication device 61 of the server 60 described in the first embodiment. The image processing device 2 corresponds to the image processing device 2 in the aforementioned server 60.

The image processing device 2 recognizes an object, such as an accessory on the road, from the image data captured with the imaging device 1001. In addition, the image processing device 2 sets a sign, such as a speed sign, on a reference image so as to recognize the sign from the image data.

The display device 1005 displays the recognized image of the speed sign and the like transmitted from the server and the like 1003 on a display screen (not shown) of the mobile terminal device 1008 (e.g., smartphone).

The output device 1006 outputs alert information transmitted from the server and the like 1003 from a speaker of the mobile terminal device 1008 or displays such information on a display screen (not shown).

Further, an image of a spot where an alert was output (i.e., the detected or recognized image) may be registered in the server 1003 and/or the mobile terminal device 1008.

According to the third embodiment, it is possible to provide a warning system by recognizing a sign, such as a speed sign, from a video captured with an in-vehicle smartphone, and transmitting a set of the recognized image of the sign and alert information to the smartphone and the like.

(4) Fourth Embodiment

Figure 11:
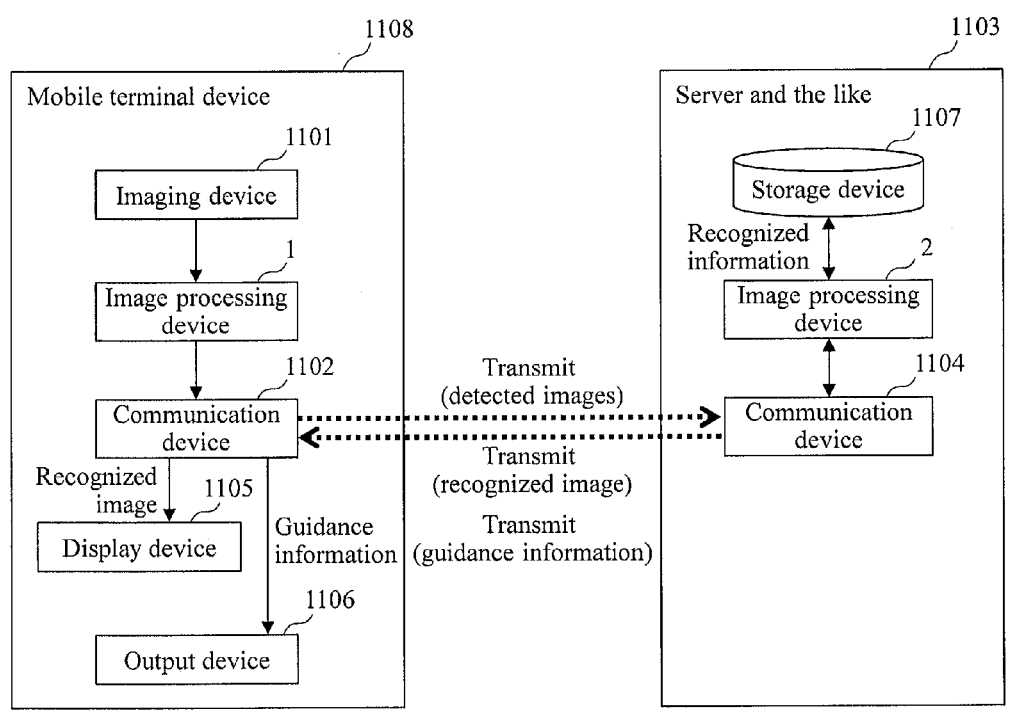
FIG. 11 is a diagram showing a schematic configuration of a simple guidance system in accordance with the fourth embodiment of the present invention.

FIG. 11 is a functional block diagram showing the configuration of a simple guidance system 1100 in accordance with the fourth embodiment of the present invention. The simple guidance system 1100 includes a server and the like 1103 and a mobile terminal device 1108. When a driving route is set by a user, for example, the simple guidance system 1100, while collecting information on a target object, such as a sign that is present on the route, in real time, presents a detected sign to the user to guide the user on the route. For example, the system does not guide a user on a map but guides a user via an audio instruction such as "turn left here" upon detection of a sign at a position where the user should turn left on the preset route.

The mobile terminal device 1108 is a device like a smartphone, for example, and includes an imaging device 1101 that captures image data, the image processing device 1 that simply detects from the image data images that contain a target to be detected, a communication device 1102 that transmits data to and receives data from the server and the like 1103, a display device 1105 that displays the recognized image transmitted from the server and the like 1003, and an output device 1106 that outputs guidance information transmitted from the server and the like 1003. Herein, the imaging device 1101 may include a CMOS sensor or a CCD camera, for example. The image processing device 1 corresponds to the image processing device 1 in the terminal device 40 described in the first embodiment. The communication device 1102 corresponds to the communication device 41 in the aforementioned terminal device 40.

The server and the like 1103 include a communication device 1104 that receives the image data transmitted from the mobile terminal device 1108 or transmits the recognized image data or guidance information to the mobile terminal device 1008, the image processing device 2 that performs image processing in accordance with the first embodiment of the present invention (i.e., image processing for closely examining whether or not a detected object is a target object and recognizing the object) on the received image data, and a storage device (e.g., a memory or a storage device) 1107 that stores the recognized image and the like output from the image processing device 2. Herein, the communication device 1104 corresponds to the communication device 61 of the server 60 described in the first embodiment. The image processing device 2 corresponds to the image processing device 2 in the aforementioned server 60.

The image processing device 2 recognizes an object, such as an accessory on the road, from the image data captured with the imaging device 1101. In addition, the imaging device 2 sets a sign, such as a direction sign (i.e., a road signpost), on a reference image so as to recognize the direction sign from the image data. In addition, the image processing device 2 detects a guidance direction from an arrow or characters on the direction sign through pattern matching of arrows or characters.

The display device 1105 displays the recognized image of the direction sign and the like transmitted from the server and the like 1103 on a display screen (not shown) of the mobile terminal device 1108 (e.g., smartphone).

The output device 1106 outputs the guidance information transmitted from the server and the like 1103 from a speaker of the mobile terminal device 1108 or displays such information on a display screen (not shown).

According to the fourth embodiment, it is possible to provide a simple guidance system by recognizing a sign, such as a direction sign, from a video captured with an in-vehicle smartphone, and transmitting a set of the recognized image of the sign and guidance information to the smartphone and the like.

(5) Conclusion (i) In the object detection system in accordance with this embodiment, images (i.e., candidate images) that contain a target object to be detected are detected by the image processing device 1 on the terminal device 40 side, and only such images are transmitted to the server 60 side, so that the object is recognized from the received images by the image processing device 2 on the server 60 side. Thus, a desired target object can be detected and the data communication amount can be reduced.

Herein, the image processing device 1 detects from each of the captured images a target to be detected on the basis of a first evaluation criterion that is a criterion for simple detection used to separate the target to be detected from the background of the captured image. Meanwhile, the image processing device 2 identifies and recognizes the target to be detected on the basis of a second evaluation criterion that is a criterion for target recognition used to identify the target to be detected by closely examining the candidate images.

(ii) The image processing device 1 in accordance with this embodiment executes a process of converting the color space of a target image, and acquiring the color information on the converted color space, a process of calculating, for the target image, the first average value indicating the average value of the lightness of the color information in a target region including the target object to be detected, a process of comparing the lightness of the color information on each pixel with the first average value, and generating a corrected image with corrected lightness/darkness, a process of extracting a region of an object on the basis of the corrected image, and a process of detecting the object by estimating an ellipse in the extracted region. More specifically, as indicated by Formula 3, lightness/darkness is corrected using information on the target image (i.e., the image N, which is the current image) such that a pixel that is darker than the average value of the lightness of the color information (i.e., the a value or the b value) becomes even darker, and a pixel that is lighter than the average value becomes even lighter, so that a corrected image (i.e., an image with further enhanced lightness/darkness) is generated. In this case, lightness/darkness correction may also be performed by taking into consideration the average value of the lightness of the color information on the images captured in the past (i.e., the images of up to the N−1) by introducing the magnification value v. Though such lightness/darkness correction, a region of the object is extracted from the target image. Then, an ellipse in the region is estimated to extract (i.e., detect) a desired object. Thus, even when the lightness of an image contained in a video changes depending on the traveling direction of a moving vehicle, it is possible to accurately separate the background of the image and the object in the background and thus detect the object in the background. When the images captured in the past are taken into consideration, it is possible to separate regions in each image in accordance with the lightness of the image that changes in time series.

(iii) The image processing device 2 in accordance with this embodiment compares a reference image prepared in advance with an object extracted (i.e., detected) from a target image so as to recognize the object. Accordingly, it is possible to recognize what is the extracted object.

(iv) According to the second embodiment, it is possible to recognize a specific billboard, which indicates facility information or spot information, from a video captured with an in-vehicle smartphone, and thus provide a POI information creation system based on the recognition of the specific billboard.

(v) According to the third embodiment, it is possible to recognize a sign, such as a speed sign, from a video captured with an in-vehicle smartphone, and thus provide a warning system based on the recognition of the sign.

(vi) According to the fourth embodiment, it is possible to recognize a sign, such as a direction sign, from a video captured with an in-vehicle smartphone, and thus provide a simple guidance system based on the recognition of the direction sign.

(vii) It should be noted that each of the aforementioned embodiments can be modified as follows.

Although the color space conversion unit 11 creates an image by converting the color space of an input image into a Lab color space, the color space conversion unit 11 may also convert the color space of the input image into other color spaces, such as an HSV color space, and even in such cases, similar advantageous effects are obtained.

Although the object determination unit 94 determines the similarity between a reference image and a detected object image using Formula 5, it is also possible to determine the similarity using any one of B32(r), B32(g), or B32(b), or using any combination thereof, and even in such cases, similar advantageous effects are obtained.

It should be noted that the present invention can also be realized by program codes of software that implement the functions of the embodiments. In such a case, a storage medium having recorded thereon the program codes is provided to a system or an apparatus, and a computer (or a CPU or a MPU) in the system or the apparatus reads the program codes stored in the storage medium. In this case, the program codes read from the storage medium implement the functions of the aforementioned embodiments, and the program codes and the storage medium having recorded thereon the program codes constitute the present invention. As the storage medium for supplying such program codes, for example, a flexible disk, CD-ROM, DVD-ROM, a hard disk, an optical disc, a magneto-optical disc, CD-R, a magnetic tape, a nonvolatile memory card, ROM, or the like is used.

Further, based on instructions of the program codes, an OS (operating system) running on the computer or the like may perform some or all of actual processes, and the functions of the aforementioned embodiments may be implemented by those processes. Furthermore, after the program codes read from the storage medium are written to the memory in the computer, the CPU or the like of the computer may, based on the instructions of the program codes, perform some or all of the actual processes, and the functions of the aforementioned embodiments may be implemented by those processes.

Moreover, the program codes of the software that implement the functions of the embodiments may be distributed over a network, and thereby stored in storage means such as the hard disk or the memory in the system or the apparatus, or the storage medium such as CD-RW or CD-R, and at the point of use, the computer (or the CPU or the MPU) in the system or the apparatus may read the program codes stored in the storage means or the storage medium and execute the program codes.

Finally, each of the processes and techniques described above may be essentially implemented by any suitable combination of components without being related to any specific device. Further, a variety of types of general-purpose devices can be used in accordance with the method described above. It may be advantageous to construct a dedicated device to execute the steps of the method described above. Further, a variety of inventions can be formed by appropriate combinations of a plurality of constituent elements disclosed in the embodiments. For example, some of the constituent elements may be removed from the entire constituent elements shown in the embodiments. Further, the constituent elements in different embodiments may be combined as appropriate. Although the present invention has been described with reference to specific examples, they are not for limiting purposes but for illustrative purposes in all aspects. One of ordinary skill in the art would appreciate that there is a number of combinations of hardware, software, and firmware that are suitable for implementing the present invention. For example, software that is described can be implemented by a wide range of programs or script languages, such as an assembler, C/C++, perl, Shell, PHP, or Java (registered trademark).

Further, in the aforementioned embodiments, the control lines and information lines represent those that are considered to be necessary for description purposes, and represent not all of the control lines and information lines that are necessary for a product. In practice, all of the configurations may be mutually connected.

In addition, other implementations of the present invention will become apparent to one of ordinary skill in the art from consideration of the specification and embodiments of the present invention disclosed herein. A variety of configurations and/or components in the aforementioned embodiments can be used either alone or in any combination.

DESCRIPTION OF SYMBOLS

1 Image processing device
2 Image processing device
10 Input unit
11 Color space conversion unit
12 Lightness/darkness correction unit
13 Object detection unit
14 Object determination unit
15 Drawing unit
16 Recording unit
30 Imaging device
40 Terminal device
41 Communication device
60 Server
61 Communication device
62 Memory
91 Control unit
94 Object determination unit
100 Object detection system
900 POI information creation system
1000 Warning system
1100 Simple guidance system

What is claimed is:

1. An object detection system, comprising:
a terminal device and a server, the terminal device including an imaging device configured to capture images, a first image processing device configured to receive the images from the imaging device and detect from the images an image that contains a target to be detected, and a first communication device configured to transmit data to and receive data from the server, and the server including a second communication device configured to transmit data to and receive data from the terminal device, a second image processing device configured to recognize the target to be detected from the image received from the terminal device, and a storage device configured to store data on the recognized target to be detected,
wherein the terminal device is configured to execute:
a process of, with the first image processing device, detecting from the captured images a candidate image that contains the target to be detected on the basis of a first evaluation criterion, and
a process of, with the first communication device, transmitting to the server the candidate image detected on the basis of the first evaluation criterion, and
wherein the server is configured to execute,
a process of, with the second communication device, receiving the candidate image,
a process of, with the second image processing device, recognizing from the candidate image the target to be detected contained in the candidate image on the basis of a second evaluation criterion that is different from the first evaluation criterion, and
a process of storing an image of the target to be detected and the candidate image into the storage device,
wherein the first image processing device is further configured to execute:
a process of converting a color space of the image containing the target to be detected, and acquiring color information on the converted color space,
a process of calculating, for the image containing the target to be detected, a first average value indicating an average value of lightness of the color information in a region of the target to be detected,
a process of comparing, for the region, lightness of the color information on each pixel with the first average value, and generating a corrected image with corrected lightness/darkness,
a process of extracting the region of the target to be detected on the basis of the corrected image, and
a process of detecting the target to be detected in the region,
a process of calculating, for images captured in the past prior to the image containing the target to be detected, a second average value indicating an average value of lightness of color information in a region corresponding to the region of the image containing the target to be detected, and generate the corrected image based on a proportion of the first average value and the second average value,
a process of detecting the image containing the target to be detected by estimating an ellipse in the extracted region of the target to be detected, wherein the server is configured to execute:

a process of identifying the target to be detected by comparing the target to be detected with a reference image prepared in advance, a process of generating alert information corresponding to the recognized target to be detected, and transmit to the terminal device the alert information and an image of the recognized target to be detected, and wherein the terminal device is further configured to display on a display screen the image of the target to be detected received from the server and output the alert information.

2. The object detection system according to claim 1, wherein the first evaluation criterion is a criterion for simple detection used to separate, in each of the captured images, the target to be detected from a background of the image, and the second evaluation criterion is a criterion for target recognition used to identify the target to be detected by closely examining the candidate image.

3. The object detection system according to claim 1, wherein the first image processing device is configured to extract the target to be detected by separating a background and the target to be detected in the corrected image.

4. The object detection system according to claim 1, wherein the terminal device is configured to transmit to the server the candidate image based on positional information on the image captured with the imaging device.

5. An object detection method for recognizing a desired object in a target image, comprising:

capturing images with a terminal device;

detecting an image containing a target to be detected from the images captured with the terminal device;

transmitting the image to a server from the terminal device;

recognizing, with the server, the target to be detected from the image received from the terminal device; and storing the image containing the recognized target to be detected into a storage device, wherein the detecting the image containing the target to be detected includes detecting from the images a candidate image containing the target to be detected on the basis of a first evaluation criterion, the recognizing the target to be detected includes recognizing from the candidate image the target to be detected contained in the candidate image on the basis of a second evaluation criterion that is different from the first evaluation criterion, and the storing includes storing a region of the object and the image into the storage device, wherein the terminal further executes steps of:

converting a color space of the image containing the target to be detected, and acquiring color information on the converted color space, calculating, for the image containing the target to be detected, a first average value indicating an average value of lightness of the color information in a region of the target to be detected, comparing, for the region, lightness of the color information on each pixel with the first average value, and generating a corrected image with corrected lightness/darkness, extracting the region of the target to be detected on the basis of the corrected image, and detecting the target to be detected in the region, calculating, for images captured in the past prior to the image containing the target to be detected, a second average value indicating an average value of lightness of color information in a region corresponding to the region of the image containing the target to be detected, and generate the corrected image based on a proportion of the first average value and the second average value, detecting the image containing the target to be detected by estimating an ellipse in the extracted region of the target to be detected, wherein the server further executes steps of:

identifying the target to be detected by comparing the target to be detected with a reference image prepared in advance, generating alert information corresponding to the recognized target to be detected, and transmit to the terminal device the alert information and an image of the recognized target to be detected, and wherein the terminal device is further configured to display on a display screen the image of the target to be detected received from the server and output the alert information.

* * * * *